US010281776B2

(12) United States Patent
Araki

(10) Patent No.: US 10,281,776 B2
(45) Date of Patent: May 7, 2019

(54) LIQUID CRYSTAL DISPLAY DEVICE

(71) Applicant: Japan Display Inc., Minato-ku (JP)

(72) Inventor: Shigesumi Araki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 137 days.

(21) Appl. No.: 15/415,198

(22) Filed: Jan. 25, 2017

(65) Prior Publication Data
US 2017/0212394 A1  Jul. 27, 2017

(30) Foreign Application Priority Data
Jan. 26, 2016 (JP) ................. 2016-012452

(51) Int. Cl.
*G02F 1/1343* (2006.01)
(52) U.S. Cl.
CPC .. *G02F 1/134309* (2013.01); *G02F 2201/121* (2013.01); *G02F 2201/123* (2013.01)
(58) Field of Classification Search
CPC .............................................. G02F 1/134309
See application file for complete search history.

(56) References Cited

U.S. PATENT DOCUMENTS

2013/0100393 A1  4/2013 Taniguchi et al.
2014/0055727 A1* 2/2014 Moriyama ........ G02F 1/134309
  349/106
2015/0331290 A1* 11/2015 Jung ................. G02F 1/134309
  349/38

FOREIGN PATENT DOCUMENTS

JP  2013-92612  5/2013

* cited by examiner

*Primary Examiner* — Edmond C Lau
(74) *Attorney, Agent, or Firm* — Oblon, McClelland, Maier & Neustadt, L.L.P.

(57) ABSTRACT

According to one embodiment, a liquid crystal display comprises first and second substrates and a liquid crystal layer. The first substrate comprises pixel electrodes and a common electrode in a display area. The display area includes a first display area and a second display area which is closer to an edge of the display area than the first display area. The pixel electrodes include first and second pixel electrodes, the first pixel electrode being located in a pixel in the first display area, the second pixel electrode being located in a pixel in the second display area. A second area by which the second pixel electrode and the common electrode face each other is greater than a first area by which the first pixel electrode and the common electrode face each other.

8 Claims, 12 Drawing Sheets

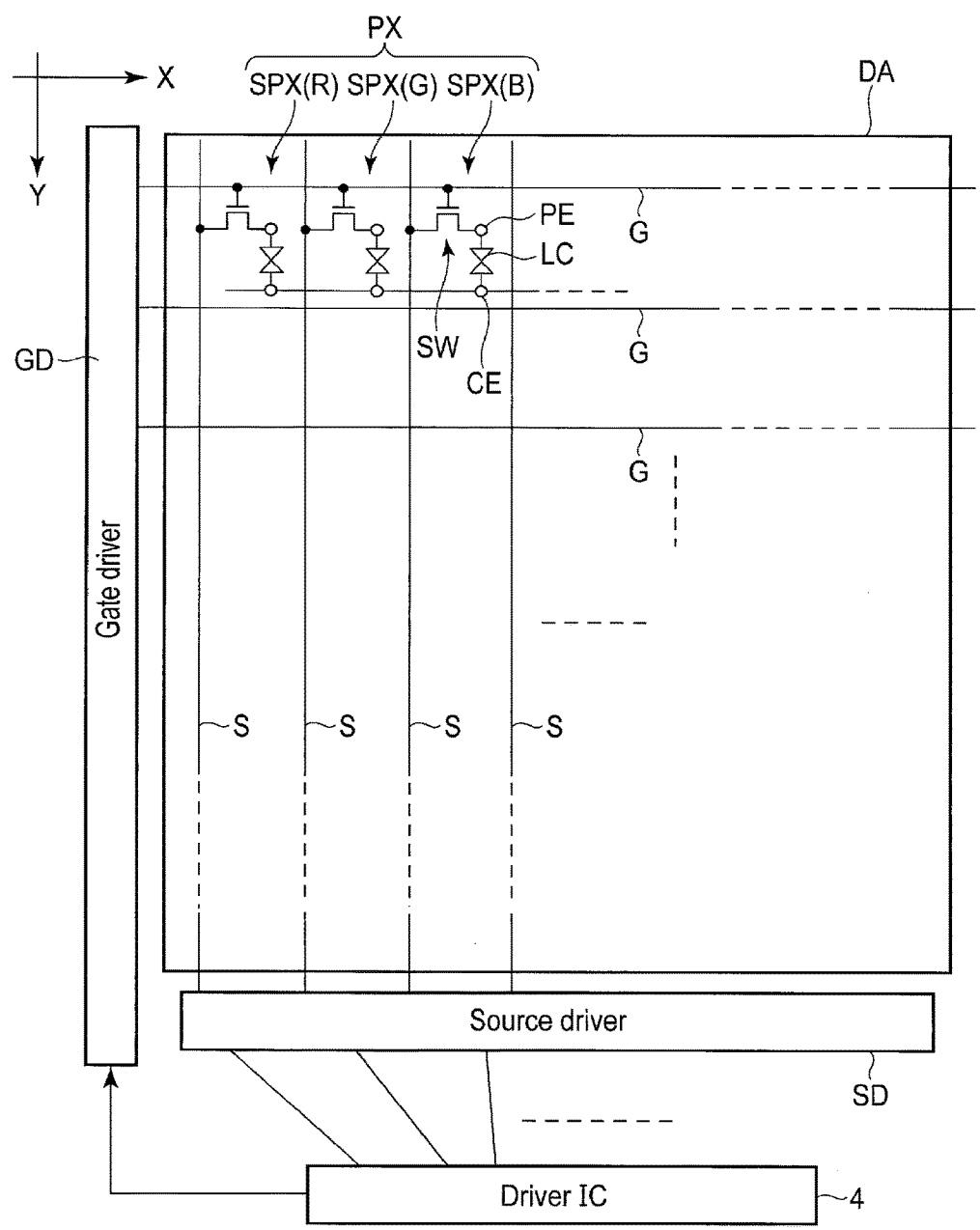
F I G. 2

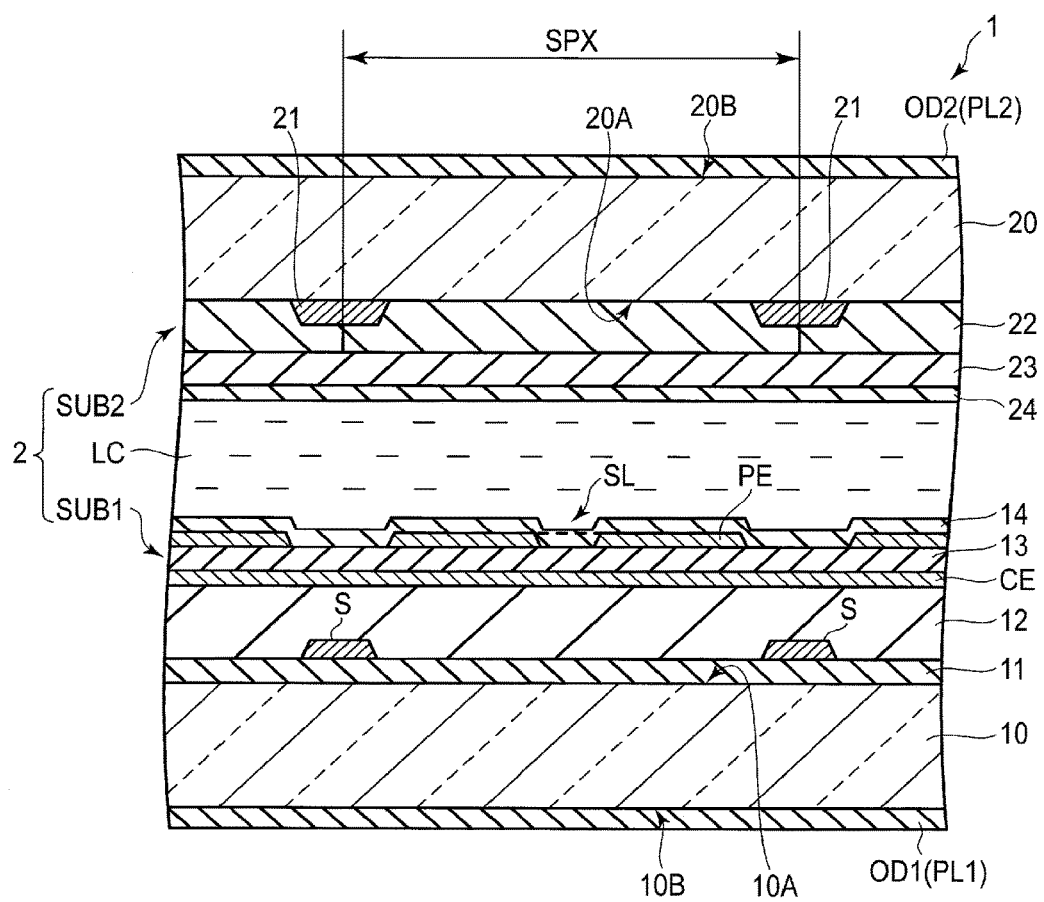
F I G. 3

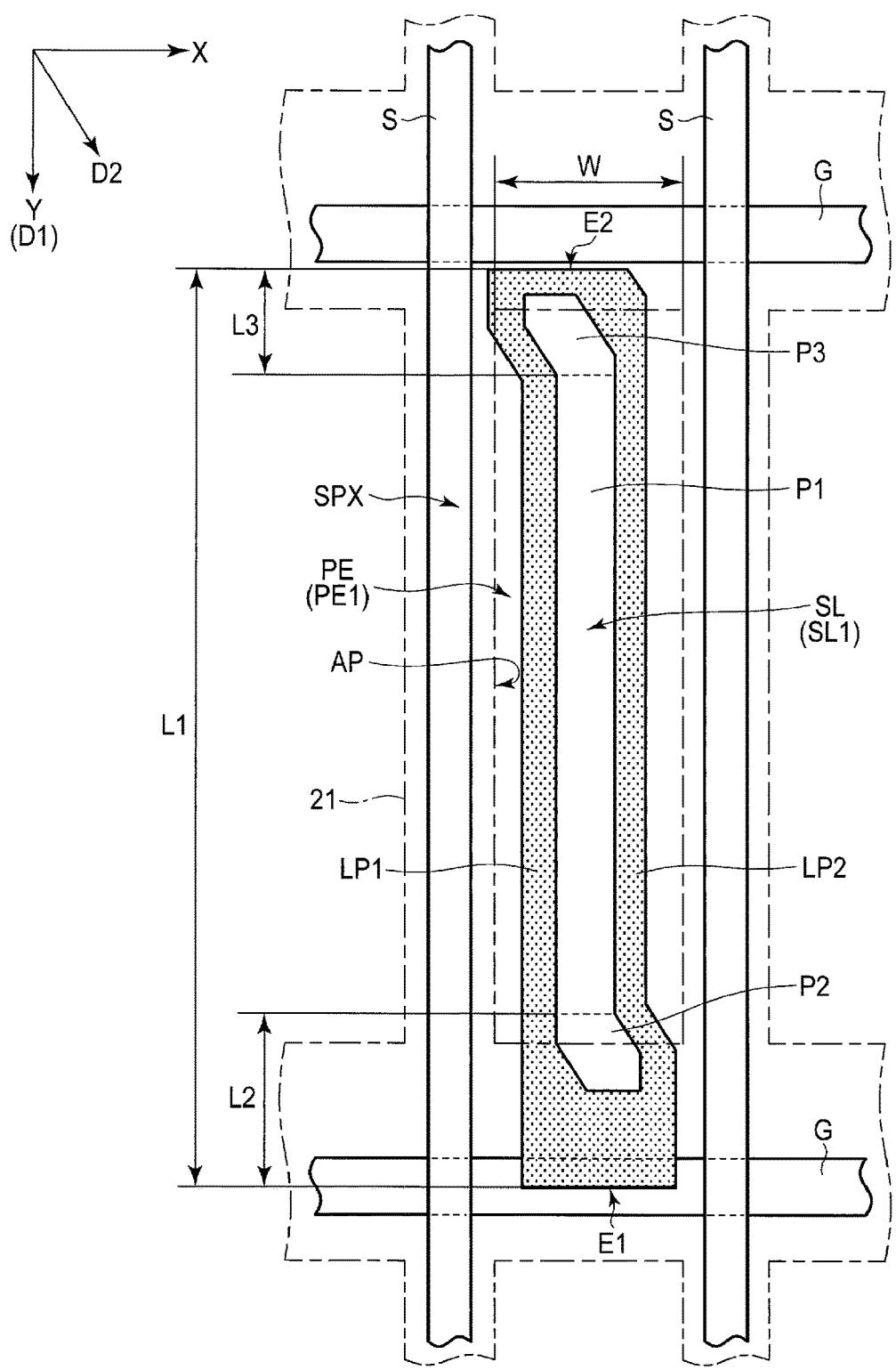
F I G. 4

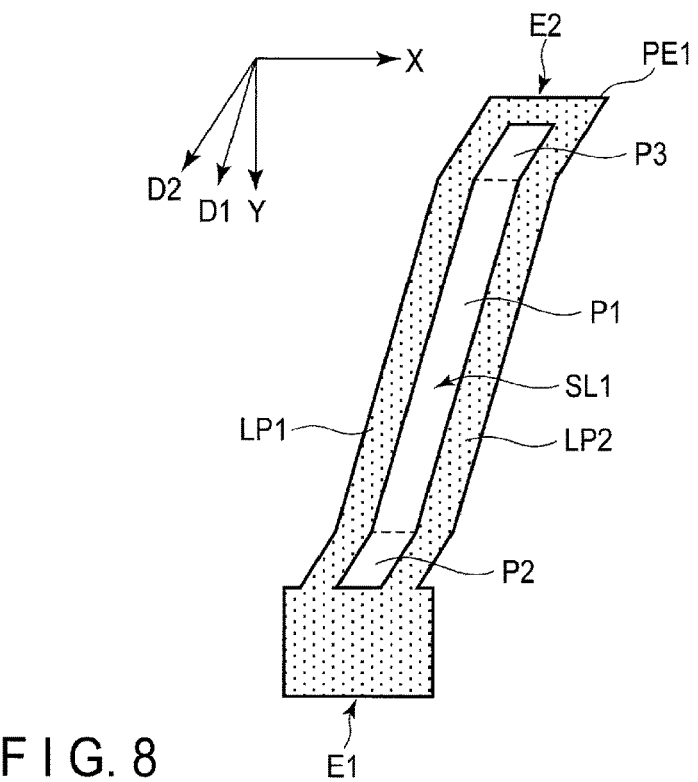
F I G. 8
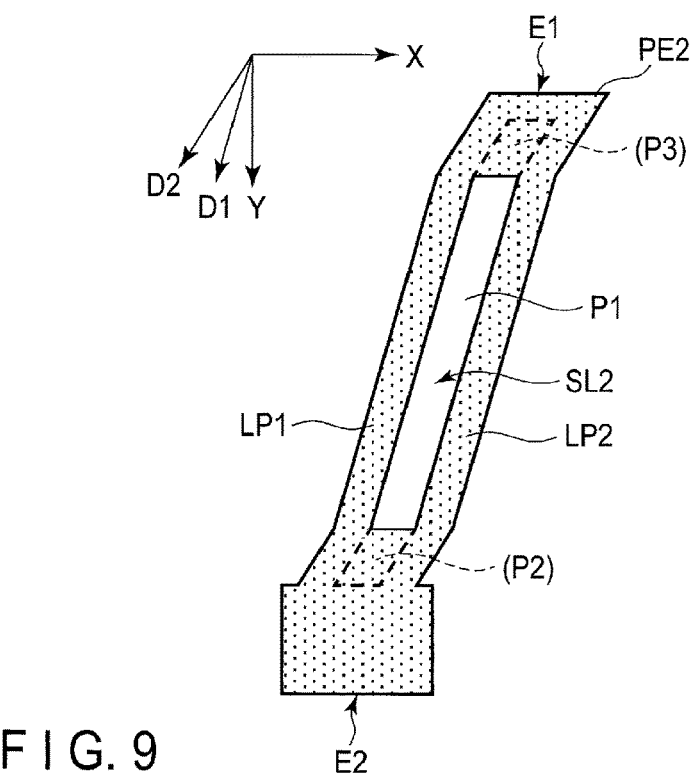
F I G. 9

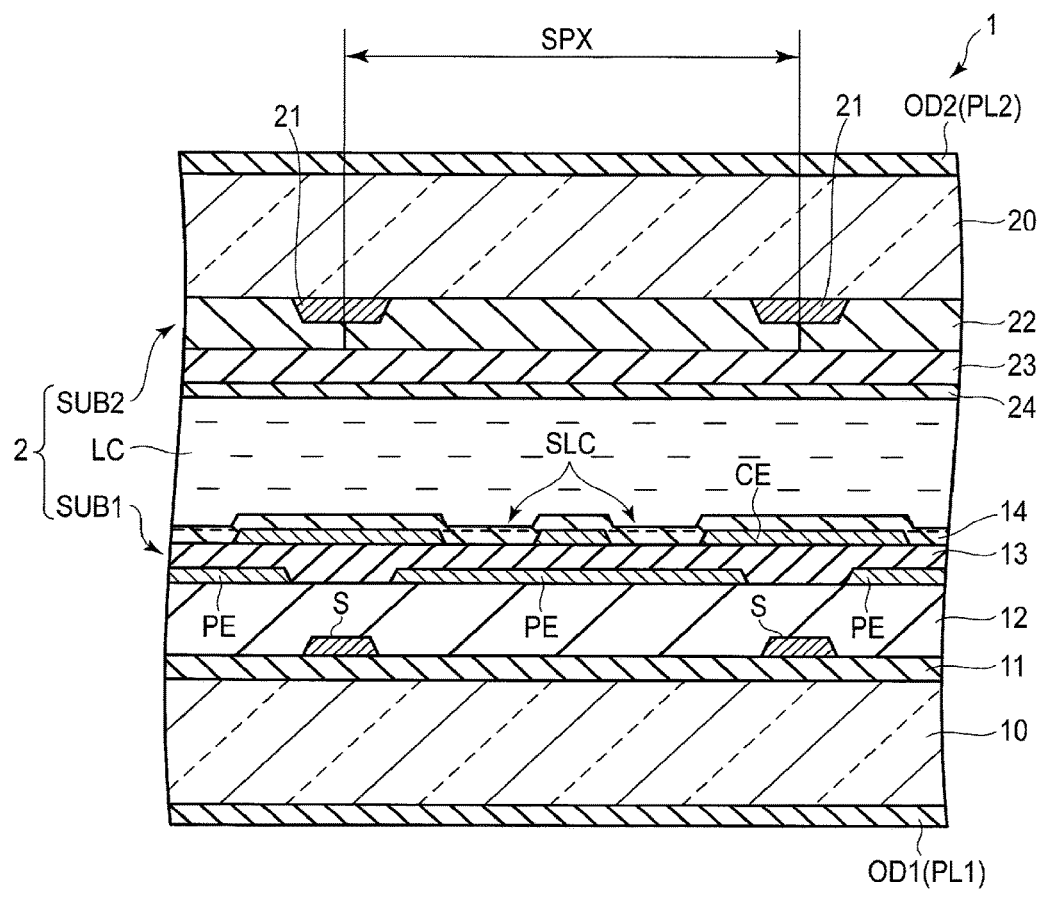
F I G. 13

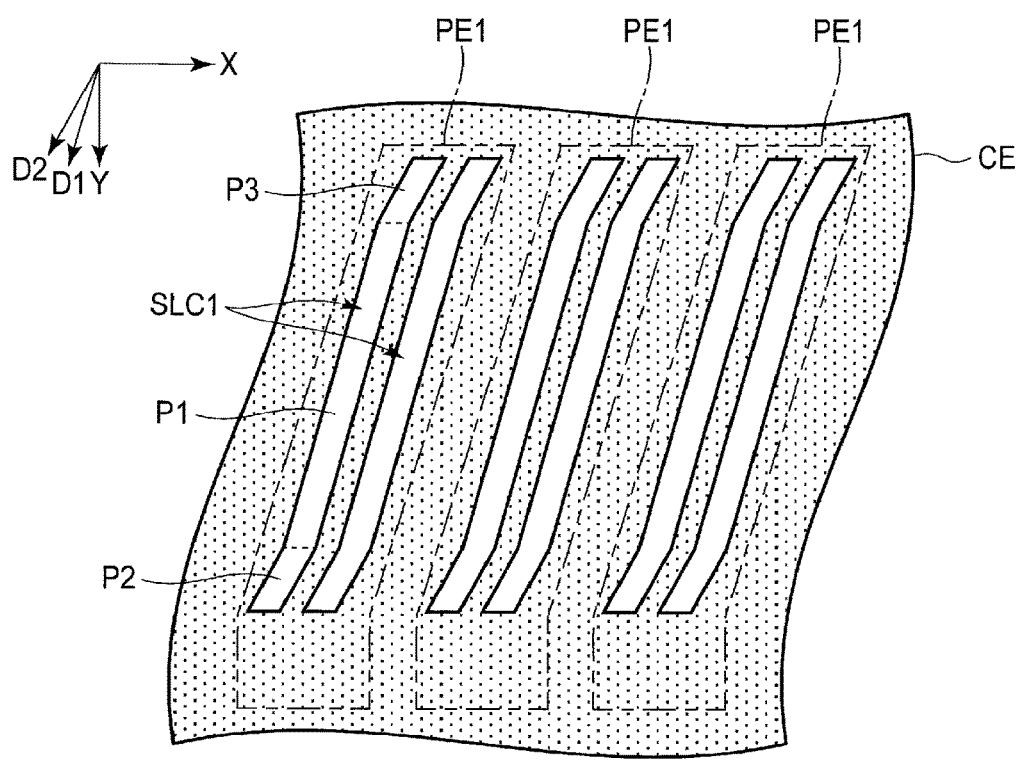
F I G. 14

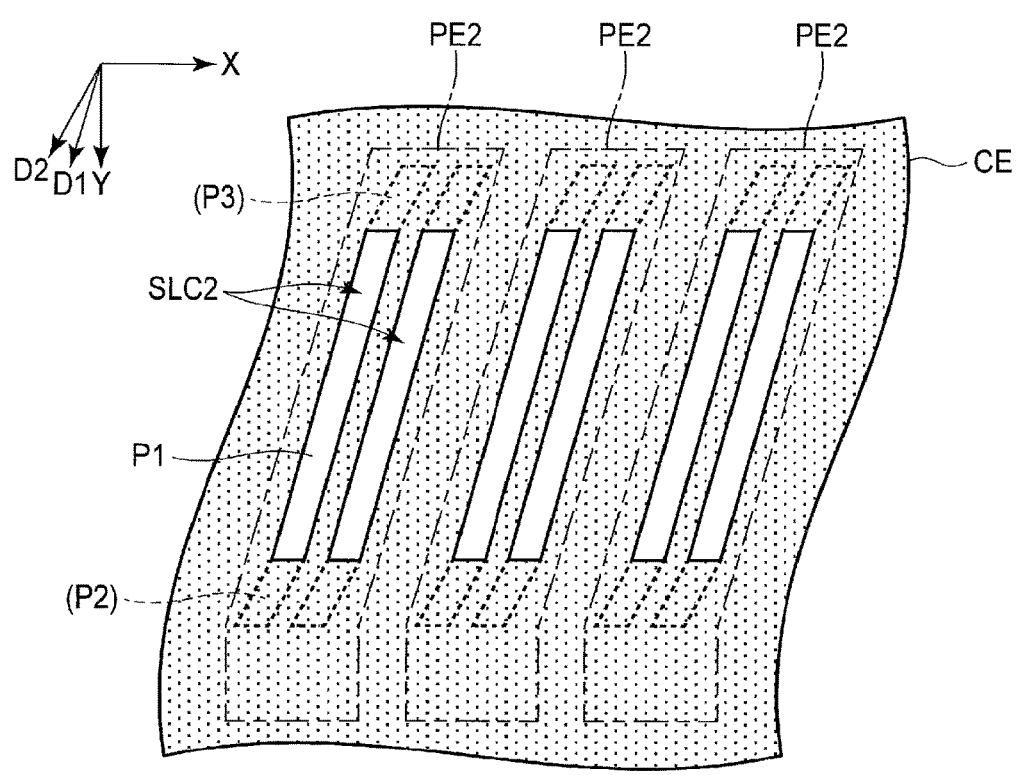
F I G. 15

LIQUID CRYSTAL DISPLAY DEVICE

CROSS-REFERENCE TO RELATED APPLICATIONS

This application is based upon and claims the benefit of priority from Japanese Patent Application No. 2016-012452, filed Jan. 26, 2016, the entire contents of which are incorporated herein by reference.

FIELD

Embodiments described herein relate generally to a liquid crystal display device.

BACKGROUND

In general, liquid crystal display devices comprising a pair of substrates and a liquid crystal layer held between these substrates are known. In the liquid crystal display device, liquid crystal molecules of the liquid crystal display layer are driven by an electric field produced between pixel electrodes provided in respective pixels and a common electrode provided over a plurality of pixels, to thereby display an image.

It has been found by a reliability test, etc. that water easily enters an edge portion of a display area in a liquid crystal display device. If water enters it, there is a case where ionic impurities seep into a liquid crystal layer, thus lowering a drive voltage to the liquid crystal layer. If the drive voltage lowers, the brightness of an image displayed in a display area can become non-uniform. Furthermore, in a control method in which a AC drive voltage is applied to a liquid crystal layer, a so-called flicker can occur in which the brightness of a displayed image periodically vary in accordance with the polarity of the above ionic impurities. This flicker is remarkably visibly recognized in the case of decreasing the frequency of the drive voltage for the purpose of reducing power consumption or the like.

BRIEF DESCRIPTION OF THE DRAWINGS

FIG. 2 is a view schematically illustrating an equivalent circuit of the liquid crystal display device.

FIG. 3 is a view illustrating an example of a cross section of the liquid crystal display device.

FIG. 4 is a view schematically illustrating an example of a planar configuration of a sub-pixel SPX.

FIG. 8 is a view illustrating an example of the shape of a first pixel electrode in a second embodiment.

FIG. 9 is a view illustrating an example of the shape of a second pixel electrode in the second embodiment.

FIG. 13 is a view illustrating an example of a cross section of a liquid crystal display device according to a fifth embodiment.

FIG. 14 is a view illustrating an example of shapes of a first pixel electrode and a common electrode in the fifth embodiment.

FIG. 15 is a view illustrating an example of shapes of a second pixel electrode and the common electrode in the fifth embodiment.

DETAILED DESCRIPTION

In general, according to one embodiment, a liquid crystal display device comprises a first substrate, a second substrate, and a liquid crystal layer. The first substrate comprises pixel electrodes and a common electrode opposite to the pixel electrodes, the pixel electrodes being respectively provided in a plurality of pixels arranged in a display area. The second substrate is opposite to the first substrate. The liquid crystal layer is held between the first substrate and the second substrate. The display area includes a first display area and a second display area which is closer to an edge of the display area than the first display area. The pixel electrodes include a first pixel electrode and a second pixel electrode, the first pixel electrode being located in the pixel which is located in the first display area, the second pixel electrode being located in the pixel which is located in the second display area. A second area by which the second pixel electrode in the second display area and the common electrode face each other is greater than a first area by which the first pixel electrode in the first display area and the common electrode face each other.

Embodiments will be described with reference to accompanying drawings.

The disclosure is a mere example, and arbitrary change of gist which can be easily conceived by a person of ordinary skill in the art naturally falls within the inventive scope. To better clarify the explanations, the drawings may pictorially show width, thickness, shape, etc., of each portion as compared with an actual aspect, but they are mere examples and do not restrict the interpretation of the invention. In some cases, in each of the drawings, reference numbers of identical or similar elements, which are successively disposed, are omitted. Furthermore, In the present specification and drawings, after structural elements are each explained once with reference to the drawings, there is a case where their explanations will be omitted, and those identical to or similar to the explained structural elements will be denoted by the same reference numbers, respectively, as the explained structural elements.

With respect to each of the embodiments, a transmissive liquid crystal display device provided with a backlight will be described as an example of a display device. However, each of the embodiments does not preclude the application of individual technical ideas disclosed in the embodiments to other kinds of display devices. The other kinds of display devices include, for example, a liquid crystal display device having a reflection function of reflecting external light, and using the reflected light to display an image.

First Embodiment

Figure 1:
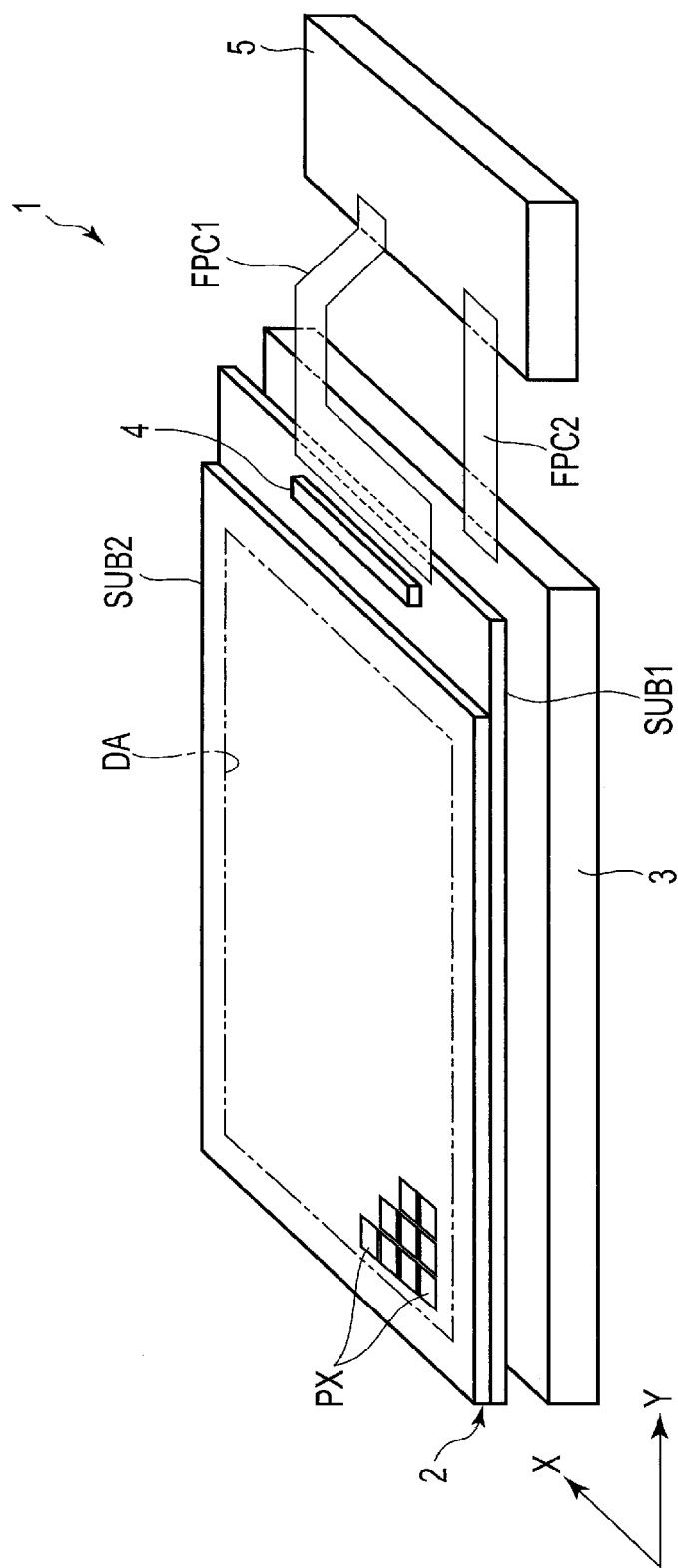
FIG. 1 is a perspective view illustrating a schematic configuration of a liquid crystal display device according to a first embodiment.

FIG. 1 is a schematic perspective view illustrating a liquid crystal display device 1 according to the first embodiment. The liquid crystal display device 1 can be used in various devices such as a smartphone, a tablet device, a cell phone, a personal computer, a television receiver, in-car equipment and a games console.

The liquid crystal display device 1 comprises a display panel 2, a backlight 3, a driver IC chip 4 which drives the display panel 2, a control module 5 which controls the operations of the display panel 2 and the backlight 3, and flexible printed circuits FPC1 and FPC2 which transmit control signals to the display panel 2 and the backlight 3.

In the first embodiment, a first direction X and a second direction Y are defined as shown in FIG. 1. The first direction X is a direction along, for example, short sides of the display panel 2. The second direction Y is a direction along, for example, long sides of the display panel 2. In the example illustrated in FIG. 1, the directions X and Y are perpendicular to each other; however, they may cross each other at an angle other than a right angle.

The display panel 2 includes a first substrate SUB1, a second substrate SUB2 located opposite to the first substrate SUB1, and a liquid crystal layer (a liquid crystal layer LC to be described later) provided between the first substrate SUB1 and the second substrate SUB2. The display panel 2 includes a display area DA for displaying an image. The display panel 2 comprises, for example, a plurality of pixels PX arranged in a matrix in the first direction X and the second direction Y in the display area DA.

The backlight 3 is located opposite to the first substrate SUB1. The driver IC chip 4 is mounted on, for example, the first substrate SUB1. However, the driver IC chip 4 may be mounted on the control module 5 or the like. The flexible printed circuit FPC1 connects the first substrate SUB1 and the control module 5. The flexible printed circuit FPC 2 connects the backlight 3 and the control module 5.

FIG. 2 is a schematic view illustrating an equivalent circuit of the liquid crystal display device 1. The liquid crystal display device 1 comprises a gate driver GD, a source driver SD, scanning lines D and signal lines S. The scanning lines G are connected to the gate driver GD. The signal lines S are connected to the source driver SD, and cross the scanning lines G.

In the display area DA, the scanning lines G extend in the first direction X, and are arranged in the second direction Y. In the display area DA, the signal lines S extend in the second direction Y, and are arranged in the first direction X. The scanning lines G and the signal lines S are formed in the first substrate SUB1.

In the example illustrated in FIG. 2, areas defined by the scanning lines G and the signal lines S correspond to sub-pixels SPX, respectively. For example, a single pixel PX comprises sub-pixels for displaying red (R), green (G) and blue (B), respectively. Also, the pixel PX may further comprise a sub-pixel for displaying white or the like. Alternatively, the pixel PX may comprise a plurality of sub-pixels for displaying the same color. It should be noted that in the following, there is a case where sub-pixels SPX are simply referred to as pixels.

Sub-pixels SPX include switching elements PSW, pixel electrodes PE and a common electrode CE. The switching elements SW, the pixel electrodes PE and the common electrode CE are formed in the first substrate SUB1, as well as the scanning lines G and the signal lines S. The switching elements SW and the pixel electrodes PE are respectively provided in the sub-pixels SPX. The switching elements PSW are electrically connected to the scanning lines G, the signal lines S and the pixel electrodes PE. The common electrode CE is formed below a plurality of sub-pixels SPX, and opposite to the pixel electrodes PE of the sub-pixels SPX.

The gate driver GD supplies a scanning signal to the scanning lines G successively. The source driver SD selectively supplies signal lines S with an image signal. When a scanning signal is supplied to a scanning line G connected to a given switching element SW, and an image signal is supplied to a signal line S connected to the switching element SW, a voltage corresponding to the image signal is applied to an associated pixel electrode PE. At this time, an electrical field is produced between the pixel electrode PE and the common electrode C, and causes an alignment state of liquid crystal molecules of a liquid crystal layer LC to change from an initial alignment state in which a voltage is not applied to the liquid crystal layer LC. By the above operation, an image is displayed in the display area DA.

FIG. 3 is a view schematically illustrating an example of a cross section of part of the display device 1 which is located in the display area DA. The cross section of FIG. 3 is illustrated as a cross section of part including a single sub-pixel SPX. In the part illustrated in FIG. 3, the first substrate SUB1 comprises a first insulating substrate 10, a first insulating layer 11, a second insulating layer 12, a third insulating layer 13, a first alignment film 14, a pixel electrode PE, the common electrode CE and signal lines S.

The first insulating substrate 110 includes a first surface 10A facing the second substrate SUB2, and a second surface 10B facing the above backlight 3. The first insulating layer 11 is formed on the first surface 10A. The signal lines S are formed on the first insulating film 11. The second insulating film 12 covers the first insulating layer 11 and the signal lines S. The common electrode CE is formed on the second insulating film 12. The third insulating layer 13 covers the common electrode CE. The pixel electrode PE is formed on the third insulating layer 13. The first alignment film 14 covers the pixel electrode PE and the third insulating layer 13.

The pixel electrode PE includes a slit SL. The pixel electrode PE and the common electrode CE are formed of transparent conductive material such as indium tin oxide (ITO). Between the pixel electrode PE and the common electrode CE, a holding capacitance is provided, and holds charge.

The second substrate SUB2 comprises a second insulating substrate 20, a light-shielding layer 21, a color filter 22, an overcoat layer 23, and a second alignment film 24. The second insulating substrate 20 includes a first surface 20A facing the first substrate SUB1, and a second major surface 20B located on the opposite side of the first surface 20A. The light-shielding layer 21 is formed on the first surface 20A, and defines the sub-pixel SPX. The color filter 22 is also formed on the second surface 20A, and colored to have a color which is displayed by the sub-pixel SPX. The overcoat layer 23 covers the color filter 22. The second alignment film 24 covers the overcoat layer 23. The liquid crystal layer LC, which contains liquid crystal molecules, is formed between the first alignment film 14 and the second alignment film 24.

A first optical element OD1 including a first polarizer PL1 is provided on the second surface 10B of the first insulating substrate 10. A second optical element OD2 including a second polarizer PL2 is provided on the second surface 20B of the second insulating substrate 20. Polarizing axes (or absorption axes) of the first polarizer PL1 and the second polarizer PL2 are perpendicular to each other.

It should be noted that the structure illustrated in FIG. 3 is a structure which can be applied to a liquid crystal display device adapted for a fringe field switching (FFS) mode which is an in-plane-switching (IPS) mode. In the FFS mode, the liquid crystal layer LC is driven by primarily using a lateral electric field (an electric field substantially parallel to main surfaces of the substrates) produced between the pixel electrode PE and common electrode CE.

Next, a planar structure of a sub-pixel SPX will be described. FIG. 4 is a view schematically illustrating an example of the planar configuration of the sub-pixel SPX. It illustrates two adjacent scanning lines G, two adjacent signal lines S, the light-shielding layer 21 and a pixel electrode PE, and omits other elements, which are provided in the display panel 2.

In the part illustrated in FIG. 4, the scanning lines G linearly extend in the first direction X, and the signal lines S linearly extend in the second direction Y. However, the scanning signal G and the signal lines need not always to linearly extend. They may be bent.

In FIG. 4, a dashed-dotted line indicates the position of an edge portion of the light-shielding layer 21. As seen in plan view, the light-shielding layer 21 is superimposed on the scanning lines G and the signal lines S. Also, the light-shielding layer 21 is superimposed on the switching element SW, etc. The light-shielding layer 21 includes an opening region AP in an area defined by the two scanning lines G and the two signal lines S. Light passing through the opening region AP substantially contributes to a display made by the sub-pixel SPX.

The pixel electrode PE includes a first end portion E1 and a second end portion E2 as both end portions in the second direction Y. In the part illustrated in FIG. 4, between the first end portion E1 and the second end portion E2, the pixel electrode PE extends in the second direction Y. Most of the pixel electrode PE is located below the opening region AP, and the first end portion E1 and the second end portion E2 are located below part of the light-shielding layer 21 which is other than the opening region AP. Both end portions of the pixel electrode PE in the first direction X are mostly located in the opening region AP. Part of the pixel electrode PE which is located close to the first end portion E1 is electrically connected to the above switching element SW through a contact hole extending through the third insulating layer 13, etc.

In the example illustrated in FIG. 4, the pixel electrode PE also includes a single slit SL and a first line portion LP1 and a second line portion LP2 which are adjacent to the slit SL. The slit SL includes a first portion P1, a second portion P2 and a third portion P3. The first portion P1 is located between the second portion P2 and the third portion P3. The second portion P2 is located on a first end portion side where the first end portion E1 is provided, and the third portion P3 is located on a second end portion side where the second end portion E2 is provided.

The first portion P1 extends in a first extension direction D1. The second portion P2 and the third portion P3 in a second extension direction D2 crossing the first extension direction D1. The first extension direction D1 is parallel to, for example, the second direction Y. In the example illustrated in FIG. 4, the second extension direction D2 is inclined in a counterclockwise direction at an acute angle with respect to the first extension direction D1.

From another point of view, each of the line portions LP1 and LP2 includes side portions which extend along the portions P1 to P3 of the slit SL to have different shapes. To be more specific, the side portion extending along the first portion P1 also extends in the first extension direction D1, and most of the side portions extending along the second and third portions P2 and P3 also extend in the second extension direction D2.

The first alignment film 14 and the second alignment film 24 are subjected to alignment treatment such as rubbing treatment and optical alignment treatment, in a direction inclined at a predetermined acute angle (for example, 5 to 15°) with respect to the first direction X. Furthermore, liquid crystal molecules contained in the liquid crystal layer LC have, for example, a negative dielectric anisotropy. With respect to the alignment orientation of a liquid crystal having a negative dielectric anisotropy, in the case where referring to FIG. 4, the counterclockwise direction is positive, the alignment direction of the liquid crystal is minus (−5 to −15°) with respect to the first direction X. In such a structure, the second portion P2 and third portion P3 of the slit SL serve to enhance an alignment function of the liquid crystal molecules when a voltage is applied to the pixel electrode PE. It should be noted that the dielectric anisotropy of the liquid crystal layer LC may be positive. Furthermore, the direction in which the alignment treatment is performed may be coincident with the first direction X or the second direction Y. In this case, the first extension direction D1 may be inclined with respect to the first direction X or the second direction Y.

In the case where a touch panel is provided in the liquid crystal display device 1, when the display panel 2 is pressed by, for example, a user's finger, there is a case where because of this pressing, a domain grows in the liquid crystal layer LC, and influences the liquid crystal layer LC even after the finger is released from the display panel 2. By contrast, in the first embodiment, when application of a pressing force is stopped, liquid crystal molecules can be aligned in a desired alignment direction by electric fields produced in the vicinity of the second portion P2 and the third portion P3. Therefore, an alignment failure does not easily occur in the liquid crystal molecules.

In an example, the length L1 of the pixel electrode PE in the second direction Y is 54 µm, the length L2 of part of the pixel electrode PE which extends from the first end portion E1 to the boundary between the first and second portions P1 and P2 is 10 µm, and the length L3 of part of the pixel electrode PE which extends from the second end portion E2 to the boundary between the first and third portions P1 and P3 is 6 µm. In this case, the length of the first portion P1 in the second direction Y is 38 µm. Furthermore, in another example, the width of the opening region AP in the first direction X is 10 µm. In this case, the distance between a left side portion of the opening region AP and the first line portion LP1, the width of the first line portion LP1, the width of the slit SL, the width of the second line portion LP2 and the distance between the second line portion LP2 and a right side portion of the opening region AP are, for example, 2 µm, 1.5 µm, 3 µm, 1.5 µm and 2 µm, respectively.

As described above, if water enters from an end portion of the display panel 2, the display panel 2, a drive voltage to the liquid crystal layer LC can lower, causing non-uniformity in the display made in the display area DA or a flicker. Such an influence of the water is easily exerted upon an edge portion (outer peripheral portion) of the display area DA.

In the first embodiment, the influence of the entrance of water can be reduced by increasing an area by which the common electrode CE and pixel electrodes PE located in the edge portion of the display area DA face each other (an area by which the pixel electrodes PE are superimposed on the common electrode CE as seen in plan view). That is, if the area is increased, holding capacitances between the pixel electrodes PE and the common electrode CE are also increased, as a result of which the amount of charge supplied to the liquid crystal layer LC can be stabilized. It is therefore possible to reduce or prevent such non-uniformity in the display and a flicker as described above. Thereby, the reliability of the liquid crystal display device 1 is improved.

Figure 5:
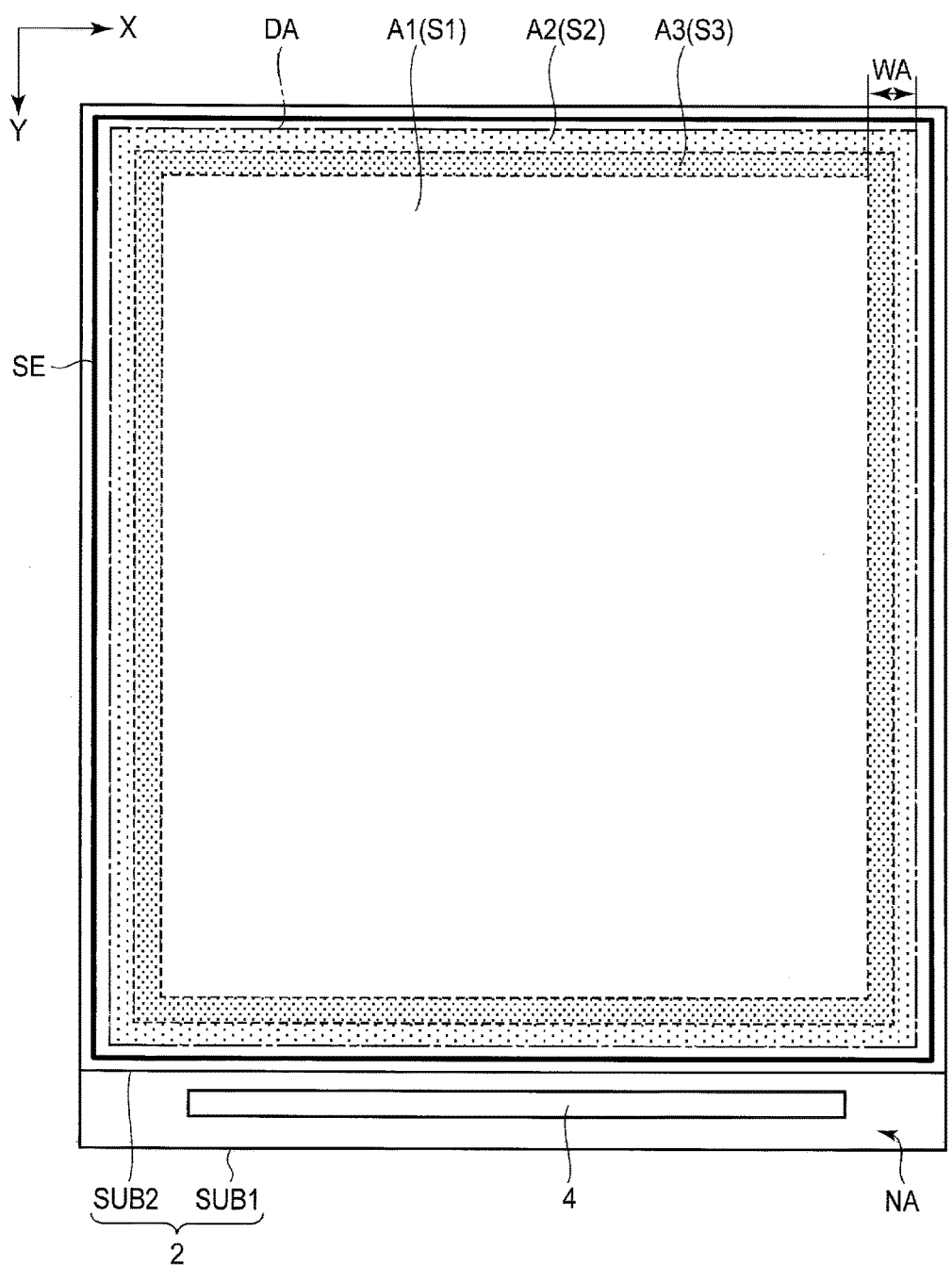
FIG. 5 is a plan view illustrating in a display area, areas in which pixel electrodes and a common electrode face each other, as areas to be increased.

FIG. 5 is a plan view illustrating in the display area DA, areas by which the pixel electrodes PE and the common electrode CE face each other, as areas to be increased. In the example illustrated in FIG. 5, the display area DA includes a first display area A1, a second display area A2 and a third display area A3. It should be noted that pixel electrodes PE provided in pixels PX located in the first display area A1, pixel electrodes PE provided in pixels PX located in the second display area A2 and pixel electrodes PE provided in pixels PX located in the third display area A3 will be referred to as first pixel electrodes PE1, second pixel electrodes PE2 and third pixel electrodes PE3, respectively. Furthermore, slits SL of the first pixel electrodes PE1, slits SL of the second pixel electrodes PE2 and slits SL of the third pixel electrodes PE3 will be referred to as first slits SL1, second slits SL2 and third slits SL3, respectively.

The area by which the first pixel electrodes PE1 and common electrode CE face each other is a first area S1. The area by which the second pixel electrodes PE2 and the common electrode CE face each other is a second area S2 which is greater than the first area S1 (S1<S2). The area by which the third pixel electrodes PE3 and the common electrode CE face each other is a third area S3 which is greater than the first area S1, and smaller than the second area S2 (S1<S3<S2). As is clear from this relationship, the capacitances between the first to third pixel electrodes PE1 to PE3 and the common electrode CE vary such that the capacitances between the first pixel electrodes PE1 and the common electrode CE are the smallest, those between the third pixel electrodes PE3 and the common electrode CE are intermediate, and those between the second pixel electrodes PE2 and the common electrode CE are the greatest. The same is true of tolerance for water entering the display panel. To be more specific, the tolerances of pixels including the first pixel electrodes PE1 are the lowest, those of pixels including the third pixel electrodes PE3 are intermediate, and those of pixels including the second pixel electrode PE2 are the highest.

The second display area A2 is closer to the edge of the display area DA than the first display area A1, and the third display area A3 is located between the first display area A1 and the second display area A2. More specifically, in the example illustrated in FIG. 5, the first display area A1 is rectangularly formed, the third display area A3 is formed in the shape of a rectangular frame surrounding the first display area A1, and the second display area A2 is formed in the shape of a rectangular frame surrounding the third display area A3.

It should be noted that the first display area A1 need not always to be rectangular. The outer periphery of the first display area A1 may have a polygonal shape except for a quadrilateral shape. Also, each of the inner and outer peripheries of the second display area A2 and the third display area A3 may be curved, and may also have a polygonal shape except for a quadrilateral shape.

Furthermore, the third display area A3 need not always to completely surround the first display area A1; that is, it may contact only part of the first display area A1. Similarly, the second display area A2 need not always to completely surround the third display area A3; that is, it may contact only part of the third display area A3.

Also, in the vicinity of a non-facing area NA (part of the first substrate SUB1 on which the second substrate SUB2 is not superimposed) where the driver IC chip 4 is mounted, the distance between an end portion of the second substrate SUB2 and the display area DA is longer than any of the distances between the display area DA and other portions of the second substrate SUB2. Thus, the vicinity of the non-facing area NA is not easily influenced by the entrance of water. Therefore, the second display area A2 and the third display area A3 may be provided to extend along sides of the display area DA, which exclude a side close to the non-facing area NA, i.e., three sides of the display area DA. Furthermore, water easily enters four corner portions of the display area DA. In view of this point, at at least these four corner portions or two of the four corner portions which are other than two corner portions close to the non-facing area NA, the second display area A2 and the third display area A3 may be provided.

In the example illustrated in FIG. 5, the width of each of the second display area A2 and the third display area A3 is constant from one end to another. The width of the second display area A2 is smaller than that of the third display area A3. In an example, the total width WA of the second display area A2 and the third display area A3 is 1 mm or more, preferably, 2 mm or more. Since the width WA is set to such a value, it is possible to appropriately prevent exertion of an influence of the entrance of water. The width of each of the second display area A2 and the third display area A3 may vary from one position to another. For example, at the four corner portions which water easily enters, the width of the second display area A2 or the third display area A3 may be increased.

It should be noted that as illustrated in FIG. 5, the display area DA is surrounded by a sealing member SE as seen in plan view. The sealing member SE is provided between the first substrate SUB1 and the second substrate SUB2, and seals up the liquid crystal layer LC between these substrates.

The areas by which the pixel electrodes PE1 to PE3 and the common electrode CE face each other can be adjusted by increasing or decreasing, for example, the areas of the pixel electrodes PE. The first pixel electrodes PE1 are each formed in the shape illustrated in, for example, FIG. 4.

Figure 6:
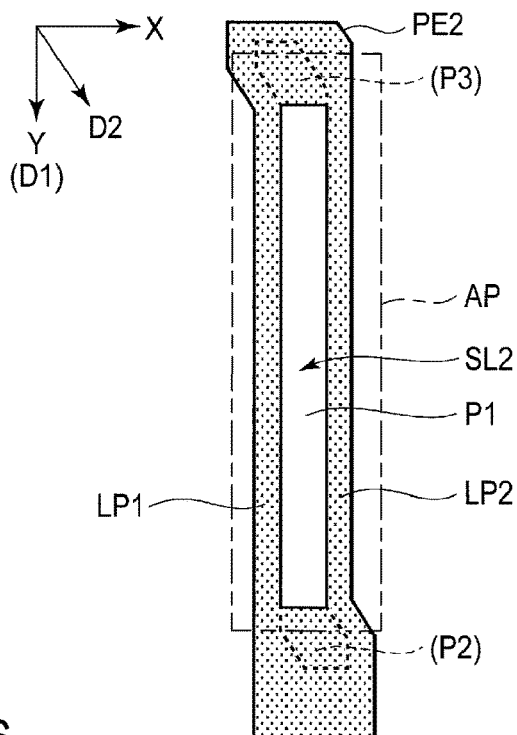
FIG. 6 is a view illustrating an example of a shape which can be applied as the shape of a second pixel electrode.

FIG. 6 is a view illustrating an example of the shape of each of the second pixel electrodes PE2. The second pixel electrode PE2 as illustrated in FIG. 6 has the same outer shape as the first pixel electrode PE1 as illustrated in FIG. 4. The second slit SL2 of the second pixel electrode PE2 includes a first portion P1, but does not include a second portion P2 and a third portion P3. That is, areas (indicated by broken lines in FIG. 6) corresponding to second and third portions P2 and P3 are filled with transparent conductive material of the second pixel electrode PE2. Thereby, the area of the second pixel electrode PE2 is greater than that of the first pixel electrode PE1, as a result of which the second area S2 is greater than the first area S1.

Figure 7:
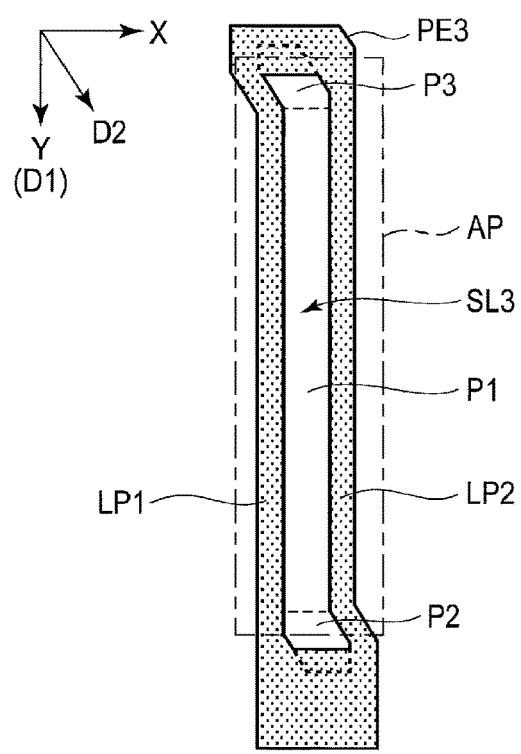
FIG. 7 is a view illustrating an example of a shape which can be applied as the shape of a third pixel electrode.

FIG. 7 is a view illustrating an example of the shape of each of the third pixel electrodes PE3. The third pixel electrode PE3 as illustrated in FIG. 7 has the same outer shape as the first pixel electrode PE1 as illustrated in FIG. 4. The third slit SL3 of the third pixel electrode PE3 includes a first portion P1, a second portion P2 and a third portion P3; however, the areas of the second portion P2 and the third portion P3 are smaller than those of the example illustrated in FIG. 4. To be more specific, the second portion P2 and the third portion P3 as illustrated in FIG. 7 are smaller than those of the example illustrated in FIG. 4 by areas (which correspond to portions indicated by broken lines in FIG. 7); that is, the areas are filled with transparent conductive material of the third pixel electrode PE3. Thereby, the area of the third pixel electrode PE3 is greater than that of the first pixel electrode PE1, and smaller than that of the second pixel electrode PE2. As a result, the third area S3 is greater than the first area S1, and smaller than the second area S2.

Referring to FIG. 4, both end portions of the first slit SL1 in the second direction Y extend to positions located outward of the opening region AP, whereas referring to FIGS. 6 and 7, both end portions of each of the slits SL2 and SL3 are provided in positions located inward of the opening region AP. However, the both end portions of the slits SL2 and SL3 in the second direction Y may extend to positions located outward of the opening region AP as in the example illustrated in FIG. 4, or they may extend to align with both end portions of the opening region AP, respectively.

It should be noted that the second pixel electrode PE2 may include a second portion P2 and a third portion P3 which are smaller in area than the first pixel electrode PE1 and the third pixel electrode PE3. Furthermore, in the second pixel electrode PE2 and the third pixel electrode PE3, the area of either the second portion P2 or the third portion P3 may be set smaller than that of the first pixel electrode PE1.

If the areas of the second and third pixel electrodes PE2 and PE3 are increased without changing the sizes of pixels PX (or sub-pixels SPX), there is a possibility that the transmissivity of the pixels PX will lower, thus causing a non-uniform display made in the shape of a frame in accordance with the second display area A2 and the third display area A3. However, it should be noted that each of the second portion P2 and the third portion P3 has a lower transmissivity than that of the first portion P1 from the beginning. Thus, in the case where the areas of the second pixel electrode PE2 and the third pixel electrode PE3 are increased by filling the second portion P2 and the third portion P3 with transparent conductive material as explained above with reference to FIGS. 4, 6 and 7, the transmissivity is hardly reduced, or slightly reduced.

Furthermore, if the areas of the second portion P2 and the third portion P3 are reduced, or they are zeroed, i.e., the second portion P2 and the third portion P3 are not provided, the above influence of the domain may be exerted. However, at the edge portion of the display area DA, where the second display area A2 and the third display area A3 are provided, a load which acts when the display panel 2 is pressed is diffused over the sealing member SE surrounding the display area DA. Thereby, the amount of deformation of the liquid crystal layer LC is reduced, as a result of which a domain is not easily produced. Furthermore, even if a domain is produced, the display quality is not greatly lowered, since the edge portion of the display area DA is located such that it cannot be easily visibly recognized.

It should be noted that if lowering of the brightness of the second display area A2 and the third display area A3 becomes a problem, the brightness of the areas A1 to A3 may be kept constant by adjusting as appropriate the area of the opening region AP (aperture ratio), the line widths of the second and third pixel electrodes PE2 and PE3 or a cell gap of the liquid crystal layer LC or the like. Also it should be noted that at the edge portion of the display area DA, color mixing depending on a viewing angle is hard to visibly recognize. In view of this point, in the case of adjusting the line widths of the second and third pixel electrodes PE2 and PE3, the distances between adjacent sub-pixels SPX may be reduced to raise a percent modulation and adjust the transmissivity.

Second Embodiment

The second embodiment will be described as follows. In the second embodiment, as the shapes of pixel electrodes PE, the following shapes can be further applied. In the second embodiment, structural features which will not be specifically referred to are the same as those of the first embodiment.

FIG. 8 is a view schematically illustrating a planar shape of a single first pixel electrode PE1 in the second embodiment. As in the example illustrated in FIG. 4, the first pixel electrode PE1 includes a first slit SL1 including a first portion P1 which extends in the first extension direction D1, and a second portion P2 and a third portion P3 which extend in the second extension direction D2.

The first pixel electrode PE1 further includes a first line portion LP1 and a second line portion LP2 which are provided to extend along the first portion P1 in the first extension direction D1, and extend along the second portion P2 and the third portion P3 in the second extension direction D2. Also, the vicinity of a first end portion E1 of the first pixel electrode PE1 has a greater width than that of the other portion of the first pixel electrode PE1 in the first direction X.

In the example illustrated in FIG. 8, the first extension direction D1 is inclined in the clockwise direction at a predetermined acute angle with respect to the second direction Y. The second extension direction D2 is inclined in the clockwise direction at a greater acute angle with respect to the second direction Y than the first extension direction D1.

FIG. 9 is a view illustrating an example of a planar shape of a single second pixel electrode PE2 in the second embodiment. A second slit SL2 of the second pixel electrode PE2 does not include second and third portions P2 and P3, as well as that in the example illustrated in FIG. 6. To be more specific, areas corresponding to second and third portions P2 and P3 (that are indicated by broken lines in FIG. 9) are filled with transparent conductive material of the second pixel electrode PE2. Thereby, the area of the second pixel electrode PE2 is greater than that of the first pixel electrode PE1 as illustrated in FIG. 8, as a result of which the second area S2 is greater than the first area S1.

For example, each of third pixel electrodes PE3 includes a third slit SL3 including a second portion P2 and a third portion P3 which are smaller in area than the first pixel electrode PE1, as in the first embodiment.

It should be noted that the second pixel electrode PE2 may include a second portion P2 and a third portion P3 which are smaller in area than the first pixel electrode PE1 and the third pixel electrode PE3.

Furthermore, in the second pixel electrode PE2 and the third pixel electrode PE3, the area of either the second portion P2 or the third portion P3 may be smaller than that of the first pixel electrode PE1.

Even in the case of using the pixel electrodes PE according to the second embodiment, it is possible to obtain the same advantage as in the first embodiment.

Third Embodiment

The third embodiment will be described as follows. With respect to the third embodiment, a modification of the second pixel electrode PE2 as illustrated in FIG. 9 will be described as follow. In the third embodiment, structural features which will not be specifically referred to are the same as those of each of the first and second embodiments.

Figure 10:
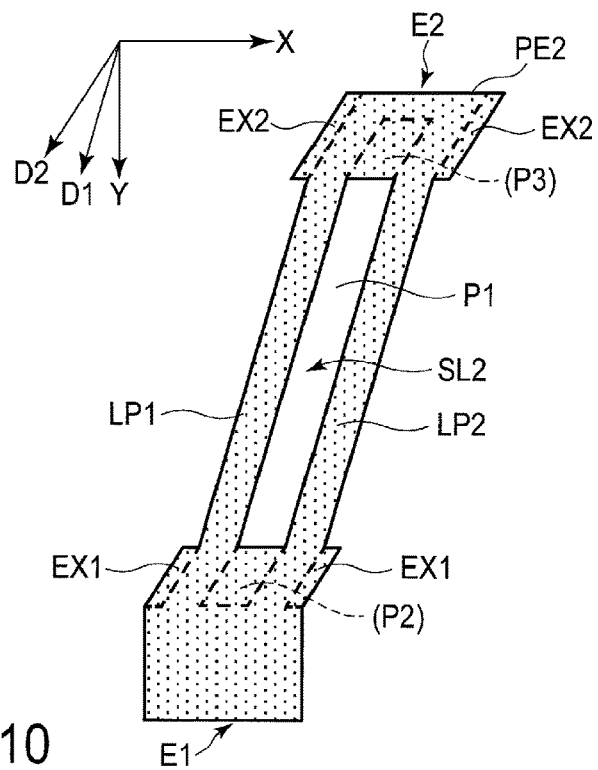
FIG. 10 is a view illustrating an example of the shape of a second pixel electrode in a third embodiment.

FIG. 10 is a view schematically illustrating a planar shape of a single second pixel electrode PE2 in the third embodiment. In the example illustrated in FIG. 9, a second slit SL2 of the second pixel electrode PE2 does not include a second portion P2 or a third portion P3. To be more specific, areas corresponding to second and third portions P2 and P3 are filled with transparent conductive material of the second pixel electrode PE2.

Furthermore, according to the third embodiment, the second pixel electrode PE2 includes further portions formed of transparent conductive material that are located outward of the second slit SL2. To be more specific, as the above portions, the second pixel electrode PE2 includes an extension portion EX1 at a first end portion E1, and an extension portion EX2 at a second end portion E2. The second pixel electrode PE2 may include a single extension portion at either the first end portion E1 or the second end portion E2.

Each of third pixel electrodes PE3 may also include extension portions EX1 and EX2. In this case, the areas of these extension portions EX1 and EX2 may be smaller than those of the second pixel electrode PE2.

In the third embodiment, since the second pixel electrode PE2 include the extension portions located outward of the second slit SL, the area of the second pixel electrode PE2 is further increased, and as a result the area of the second area S2 is also further increased. Thereby, it is possible to increase the holding capacitance of the second display area A2 of each of sub-pixels SPX. In addition, the third embodiment can obtain the same advantage as the above embodiments.

Fourth Embodiment

The fourth embodiment will be described as follows. In the fourth embodiment, as the shapes of pixel electrodes PE, the following shapes can be further applied. In the fifth embodiment, structural features which will not be specifically referred to are the same as those of each of the first to fourth embodiments.

Figure 11:
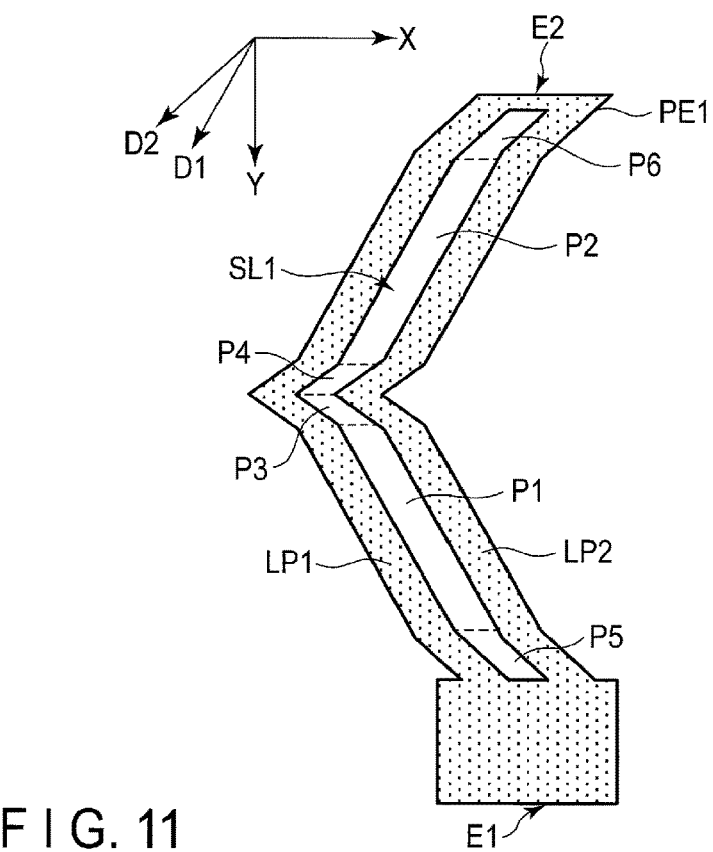
FIG. 11 is a view illustrating an example of the shape of a first pixel electrode in a fourth embodiment.

FIG. 11 is a view schematically illustrating a planar shape of a single first pixel electrode PE1 in the fourth embodiment. A first slit SL1 of the first pixel electrode PE1 includes a first portion P1, a second portion P2, a third portion P3, a fourth portion P4, a fifth portion P5 and a sixth portion P6. The third portion P3 and the fourth portion P4 are communication portions through which the first portion P1 and the second portion P2 join each other, and are provided between the first portion P1 and the second portion P2. The fifth portion P5 is continuous with the first portion P1 at a first end portion side where a first end portion E1 is located. The sixth portion P6 is continuous with the second portion P2 at a second end portion side where a second end portion E2 is located.

The first portion P1 extends in the first extension direction D1. The third portion P3 and the fifth portion P5 extend in the second extension direction D2. For example, the second, fourth and sixth portion P2, P4 and P6 and the first, third and fifth portion, P1, P3 and P5 are symmetrical with an axis parallel to the first direction X. A first line portion LP1 and a second line portion LP2 of the first pixel electrode PE1 are bent in the same manner as the first slit SL1.

The first pixel electrode PE1 formed in the above shape is a so-called dual-domain pixel electrode. To be more specific, the first portion P1 and the second portion P2, which are main portions of the first slit SL1, and the line portions LP1 and LP2, which are adjacent to these portions, extend in different directions. Thus, at the time of applying a voltage to the pixel electrode PE, liquid crystal molecules are aligned in various directions, as a result of which a wide viewing angle can be obtained.

Figure 12:
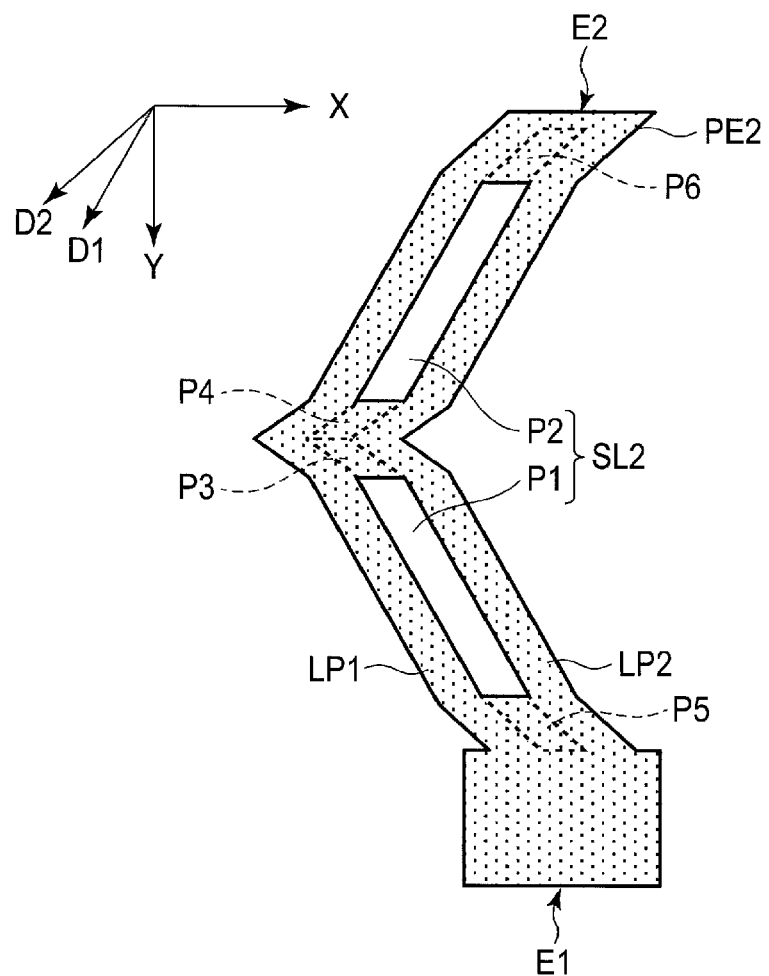
FIG. 12 is a view illustrating an example of the shape of a second pixel electrode in the fourth embodiment.

FIG. 12 is a view illustrating an example of a planar shape of a single second pixel electrode PE2. A second slit SL2 of the second pixel electrode PE2 includes first and second portions P1 and P2, but does not include third to sixth portions P3 to P6. To be more specific, areas corresponding to third to sixth portions P3 to P6 (as indicated by broken lines in FIG. 12) are filled with transparent conductive material of the second pixel electrode PE2. Thereby, the area of the second pixel electrode PE2 is greater than that of the first pixel electrode PE1 as illustrated in FIG. 11, as a result of which the second area S2 is greater than the first area S1. Furthermore, extension portions may be provided outward of the second slit SL2 as in the third embodiment.

For example, each of third pixel electrodes PE3 includes a third slit SL3 including third to sixth portions P3 to P6 which are smaller in area than those of the first pixel electrode PE1. The third slit SL3 of the third pixel electrode PE3 may be formed to further include third and fourth portions P3 and P4, but not to include fifth and sixth portion P5 and P6, as well as that of the second pixel electrode PE2.

It should be noted that the second pixel electrode PE2 may include third to sixth portions P3 to P6 the areas of which are greater than those of the first and third pixel electrodes PE1 and PE3. Furthermore, in the second and third pixel electrodes PE2 and PE3, the area of one of the third to sixth portions P3 to P6 may be set smaller than that of the first pixel electrode PE1.

Even in the case of using the pixel electrodes PE according to the fourth embodiment, it is possible to obtain the same advantage as in the first embodiment.

Fifth Embodiment

The fifth embodiment will be described as follows. It will be described by referring to an example of a liquid crystal display device 1 in which a common electrode CE is provided between pixel electrodes PE and a liquid crystal layer LC and examples of the shapes of the common electrode CE and pixel electrode PE in the liquid crystal display device 1. In the fifth embodiment, structural features which will not be specifically referred to are the same as those of each of the first to fourth embodiments.

FIG. 13 is a view schematically illustrating an example of a cross section of part of the display device 1 which is located in a display area DA. The cross section of FIG. 13 is illustrated as a cross section of part including a single sub-pixel SPX. Referring to the figure, pixel electrodes PE are formed on a second insulating layer 12, and the common electrode CE is formed on a third insulating layer 13. In this regard, the cross section of FIG. 13 is different from that of FIG. 3.

Pixel electrodes PE are provided in respective sub-pixels SPX. The pixel electrodes PE do not include slits. The common electrode CE extends over a plurality of sub-pixels SPX. In each of portions of the common electrode CE which are respectively opposite to the pixel electrodes PE, two slits SLC are formed.

In the fifth embodiment, slits SLC provided in pixels PX located in a first display area A1, slits SLC provided in pixels PX located in a second display area A2 and slits SLC provided in pixels PX located in a third display area A3 will be referred to first slits SLC1, second slits SLC2 and third slits SLC3, respectively.

FIG. 14 is a plan view illustrating an example of the shape of each of the common electrode CE and first pixel electrodes PE1 in the pixels PX in the first display area A1. It also illustrates a configuration of three sub-pixels SPX included in a single pixel PX. Areas surrounded by dashed-dotted lines correspond to the shapes of first pixel electrodes PE1.

First slits SLC1 each include a first portion P1, a second portion P2 and a third portion P3 as in the example illustrated in FIG. 8. Each first slit SLC1 is superimposed on a respective one of the first pixel electrodes PE1 as seen in plan view.

FIG. 15 is a plan view illustrating an example of the shape of each of the common electrode CE and second pixel electrodes PE2 in each of the pixels PX in the second display area A2. In the example illustrated in FIG. 15, each of second slits SLC2 does not include second and third portions P2 and P3, as well as that of the example illustrated in FIG. 9. To be more specific, areas corresponding to second and third portions P2 and P3 (as indicated by broken lines in FIG. 15) are filled with transparent conductive material of the common electrode CE. Furthermore, the second pixel electrodes PE2 have the same shape as the first pixel electrodes PE1. Thus, the second area S2 by which the second pixel electrodes PE2 and the common electrode CE face each other are greater than the first area S1 by which the first pixel electrodes PE1 and the common electrode CE face each other as in the example illustrated in FIG. 14.

For example, each of the third slits SLC3 which are superimpose on the third pixel electrodes PE3 as seen in plan view includes second and third portions P2 and P3 which are smaller in size than those of each first slit SLC1, in addition to the first portion P1. By virtue of this structure, the third area S3 by which the third pixel electrodes PE3 and the common electrode CE face each other is greater than the first area S1, and smaller than the second area S2.

It should be noted that each of the second slits SLC2 includes second and third portions P2 and P3 which are smaller in area than each first slit SLC1 or each third slit SLC3. Furthermore, in each second slit SLC2 or third slit SLC3, the area of only one of the second and third portions P2 and P3 may be reduced smaller than that of each first slit SLC1. In addition, the second portion P2 and the third portion P3 need not always to have the same area.

Even in the case of using the pixel electrodes PE according to the fifth embodiment, it is possible to obtain the same advantage as in the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, each of the embodiments is explained above with respect to the case where the display area DA is divided into three areas, i.e., the first to third areas A1 to A3, and the area (facing area) by which the pixel electrodes PE and the common electrode CE face each other is adjusted. However, it may be set that the display area DA is divided into a larger number of areas, and the above facing area gradually increases in a direction toward the end of the display area DA. Also, the display area DA may be divided into two areas only.

With respect to the first to fourth embodiments, an example of pixel electrodes PE each including a single slit SL is explained above. However, each pixel electrode PE may include a plurality of slits SL. However, in the case where each pixel electrode PE includes a plurality of slits SL, the area by which the pixel electrodes PE and the common electrode CE face each other may be adjusted by adjusting all the slits SL or by adjusting one or more of the slits.

Furthermore, with respect to the fifth embodiment, it is explained above by way of example that the common electrode CE is formed such that for each of the sub-pixels SPX, two slits SLC are formed. However, the common electrode CE may be formed such that for each sub-pixel SPX, only one slit SLC may be provided, or three or more slits SLC may be provided.

The technical concepts disclosed above with respect to the above embodiments can be combined as appropriate. For example, the first slits SLC1 of the fifth embodiment may each include first to sixth portions P1 to P6 as well as the slits SL of the fourth embodiment. In this case, each of the second slits SLC2 or the third slits SLC3 need not always to include the third to sixth portions P3 to P6, or may include third to sixth portions P3 to P6 which are smaller in area than the first slit SLC1.

In addition, it is possible to improve the transmissivity by decreasing the thickness of one or more color filters in a peripheral display area. Also, this advantage can be obtained by decreasing the area of the light-shielding layer in the peripheral display area.

What is claimed is:

1. A liquid crystal display device comprising:
a first substrate which comprises pixel electrodes and a common electrode opposite to the pixel electrodes, the pixel electrodes being respectively provided in a plurality of pixels arranged in a display area;
a second substrate opposite to the first substrate; and
a liquid crystal layer held between the first substrate and the second substrate,
the display area including a first display area and a second display area which is closer to an edge of the display area than the first display area,
the pixel electrodes including a first pixel electrode and a second pixel electrode, the first pixel electrode being located in the pixel which is located in the first display area, the second pixel electrode being located in the pixel which is located in the second display area, and
a second area by which the second pixel electrode in the second display area and the common electrode face each other being greater than a first area by which the first pixel electrode in the first display area and the common electrode face each other, wherein
the pixel electrodes are provided between the common electrode and the liquid crystal layer,
the first pixel electrode include a first slit,
the second pixel electrode include a second slit,
the first slit includes a first portion and a second portion, the first portion extending in a first extension direction, the second portion extending in a second extension direction crossing the first extension direction, and
the second slit includes a first portion corresponding to the first portion of the first slit, and no second portion corresponding to the second portion of the first slit.

2. A liquid crystal display device comprising:
a first substrate which comprises pixel electrodes and a common electrode opposite to the pixel electrodes, the pixel electrodes being respectively provided in a plurality of pixels arranged in a display area;
a second substrate opposite to the first substrate; and
a liquid crystal layer held between the first substrate and the second substrate,
the display area including a first display area and a second display area which is closer to an edge of the display area than the first display area,
the pixel electrodes including a first pixel electrode and a second pixel electrode, the first pixel electrode being located in the pixel which is located in the first display area, the second pixel electrode being located in the pixel which is located in the second display area, and
a second area by which the second pixel electrode in the second display area and the common electrode face each other being greater than a first area by which the first pixel electrode in the first display area and the common electrode face each other, wherein
the pixel electrodes are provided between the common electrode and the liquid crystal layer,
the first pixel electrode include a first slit,
the second pixel electrode include a second slit,
the first slit includes a first portion and a second portion, the first portion extending in a first extension direction, the second portion extending in a second extension direction crossing the first extension direction, and
the second slit includes a first portion corresponding to the first portion of the first slit, and a second portion which is smaller in area than the second portion of the first slit.

3. A liquid crystal display device comprising:
a first substrate which comprises pixel electrodes and a common electrode opposite to the pixel electrodes, the pixel electrodes being respectively provided in a plurality of pixels arranged in a display area;
a second substrate opposite to the first substrate; and
a liquid crystal layer held between the first substrate and the second substrate,
the display area including a first display area and a second display area which is closer to an edge of the display area than the first display area,
the pixel electrodes including a first pixel electrode and a second pixel electrode, the first pixel electrode being located in the pixel which is located in the first display area, the second pixel electrode being located in the pixel which is located in the second display area, and
a second area by which the second pixel electrode in the second display area and the common electrode face each other being greater than a first area by which the first pixel electrode in the first display area and the common electrode face each other, wherein
the pixel electrodes are provided between the common electrode and the liquid crystal layer,
the first pixel electrode include a first slit,
the second pixel electrode include a second slit,
the first slit include a first portion extending in a first extension direction, a second portion extending in a second extension direction crossing the first extension direction, and a communication portion through which the first portion and the second portion join each other, and the second slit includes a first portion and a second portion which are corresponding to the first portion and the second portion of the first slit, respectively, and no communication portion corresponding to the communication portion of the first slit.

4. The liquid crystal display device of claim 1, wherein the second display area surrounds the first display area.

5. The liquid crystal display device of claim 1, wherein the display area further includes a third display area which is located between the first display area and the second display area,
the pixel electrodes further include a third pixel electrode located in the pixel which is located in the third display area, and
a third area by which the third pixel electrode in the third display area and the common electrode face each other is greater than the first area and smaller than the second area.

6. The liquid crystal display device of claim 5, wherein the third display area surrounds the first display area, and the second display area surrounds the third display area.

7. The liquid crystal display device of claim 1, wherein the second pixel electrode includes a first end portion, a second end portion opposite to the first end portion, and an extension portion provided at at least one of the first end portion and the second end portion, and
the first pixel electrode includes no extension portion corresponding to the extension portion of the second pixel electrode.

8. A liquid crystal display device comprising:
a first substrate which comprises pixel electrodes and a common electrode opposite to the pixel electrodes, the pixel electrodes being respectively provided in a plurality of pixels arranged in a display area;
a second substrate opposite to the first substrate; and
a liquid crystal layer held between the first substrate and the second substrate,
the display area including a first display area and a second display area which is closer to an edge of the display area than the first display area,
the pixel electrodes including a first pixel electrode and a second pixel electrode, the first pixel electrode being located in the pixel which is located in the first display area, the second pixel electrode being located in the pixel which is located in the second display area, and
a second area by which the second pixel electrode in the second display area and the common electrode face each other being greater than a first area by which the first pixel electrode in the first display area and the common electrode face each other, wherein
the common electrode is provided between the pixel electrodes and the liquid crystal layer, and includes a first slit and a second slit, the first slit being superimposed on the first pixel electrode, the second slit being superimposed on the second pixel electrode,
the first slit includes a first portion and a second portion, the first portion extending in a first extension direction, the second portion extending in a second extension direction crossing the first extension direction, and
the second slit includes a first portion corresponding to the first portion of the first slit, and no second portion corresponding to the second portion of the first slit.

* * * * *